Dec. 30, 1941. G. STEINLEIN ET AL 2,267,956
FREEWHEEL BRAKE HUB DRIVEN BY A MOTOR MOUNTED IN THE DRIVING WHEEL
Filed Feb. 4, 1939
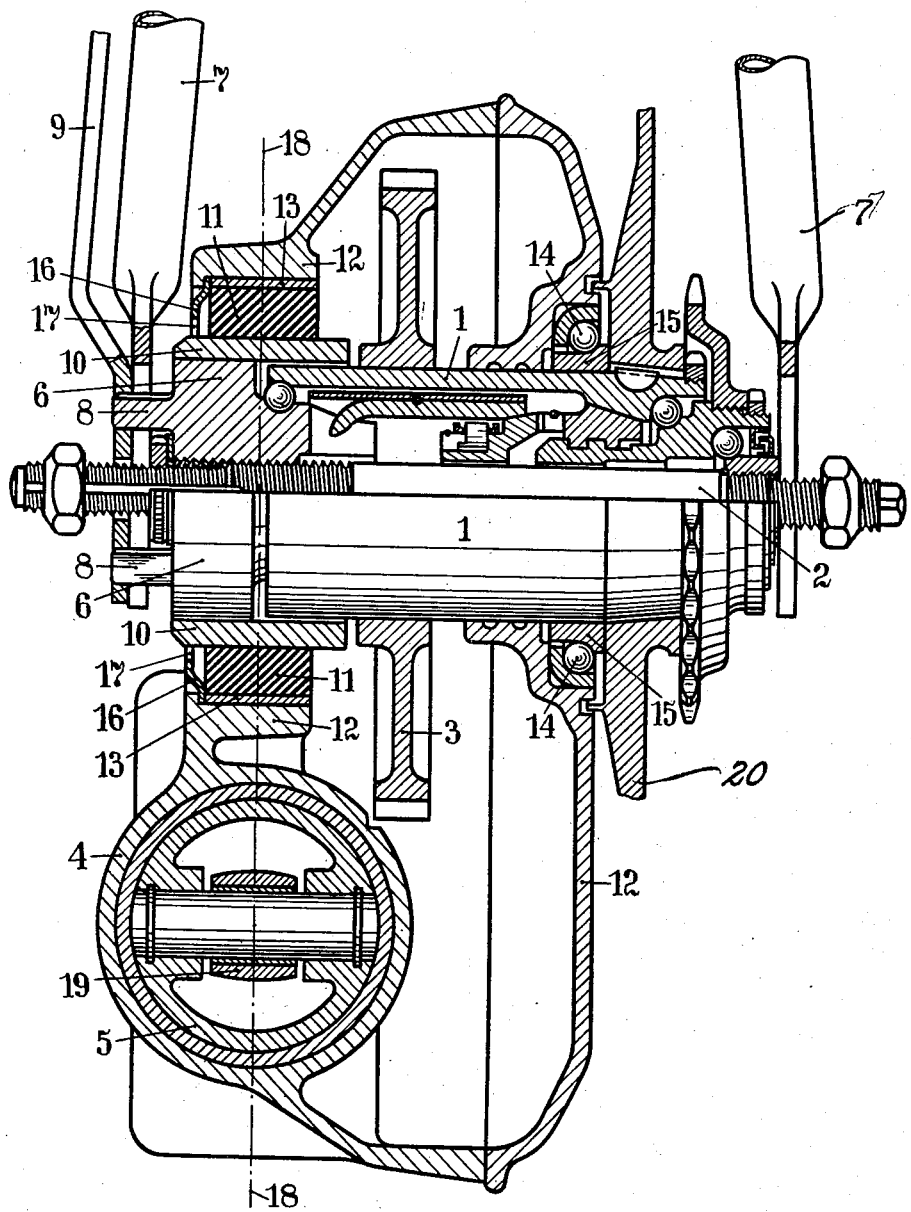
Inventors
Gustav Steinlein
and
Ludwig Bruckmoser
by
Dean Fairbanks & Hirsch Patented Dec. 30, 1941

2,267,956

UNITED STATES PATENT OFFICE 2,267,956

FREEWHEEL BRAKE HUB DRIVEN BY A MOTOR MOUNTED IN THE DRIVING WHEEL

Gustav Steinlein, Mainberg, near Schweinfurt, and Ludwig Bruckmoser, Schweinfurt, Germany Application February 4, 1939, Serial No. 254,568
In Germany February 17, 1938

4 Claims. (Cl. 180—33)

The invention relates to a free-wheel brake hub, and especially a free-wheel hub with a back-pedalling brake driven by a motor mounted in the driving wheel of a conventional bicycle, as disclosed in our Letters Patent No. 2,138,619, and in which is shown an annular rubber body arranged between flanged rings to cushion the torsional stresses of the motor. However this known construction does not allow a spring action in a direction substantially radial or transverse to the axis of the hub, due to the fact that the flanged rings which are used in connection with the annular body of rubber prevent transmission of transverse stresses to said body.

Apart from the torsional vibrations of the motor, there also occur other vibrations originating from the fact that as yet it has not been possible to perfectly counterbalance the compressive forces of inertia of the single-cylinder crank drive; that is to say, even with the best arrangement of counterweights intended for the counterbalancing of the forces caused by the revolving masses, there remain remnants of forces at the crank-shaft which in form of vibrations are transmitted to the frame of the vehicle.

Polar diagrams of the forces of inertia of a single-cylinder motor prove that lateral forces of considerable magnitude may manifest themselves.

The formerly practised arrangement for the absorption of the reacting motor torque by free-wheel brake hubs of the kind previously alluded to, merely facilitates the cushioning of such forces of inertia of the motor as cause rotatory motion around the hub shaft, while all forces of inertia acting transversely to such forces are transmitted to the chassis in an uncushioned form.

Essentially, our invention provides the arrangement of the said annular body of rubber in a manner enabling it to receive not only the forces acting upon it in a tangential direction, and producing a rotatory motion around the hub shaft, but also the forces transversely occurring thereto in a substantially radial direction.

It is by no means desirable that the transverse or substantially radial motions become as big as the tangential ones. That condition can quite excellently be met by means of an annular body of rubber in the manner that the ratio between the motions in a radial direction and those in a tangential direction approximates 1 to 10.

Our invention results in the advantage that all occurring forces of the motor crank drive are perfectly cushioned, provided the further condition is also fulfilled according to which the middle plane of the connecting rod passes through the annular rubber spring. If with the motor-driven free-wheel brake hub, which in this case in addition to the rubber spring requires in form of a ball bearing a supporting point for the motor- and gear-case respectively against the free-wheel hub, the middle plane of the connecting rod were not to pass through the annular body of rubber, there would still manifest themselves certain, though minor, remnants of forces which by way of such bearing may pass uncushioned over to the frame.

Our invention further provides the arrangement of the annular body of rubber on the free-wheel brake hub in such a manner as to also provide for a spring action of said annular body of rubber in an axial direction. In this connection it is possible to make the arrangement in such a manner that the abovementioned ball bearing provided as a motor support is given advanced tension so that by this spring action the annular body is permanently kept under some slight axial pressure, and enabled, even when worn, to work free from any play during its entire life.

On its side, the annular body of rubber may be equipped with a protective covering safeguarding it against destructive influences. Unless the use of oil-proof synthetic rubber is provided for, it is advisable to provide for some kind of flexible oil-proof covering, or the like, especially on the side facing the gear for instance.

In the accompanying drawing there is shown for the purpose of illustration an axial section of a free-wheel hub with back-pedalling brake equipped with an elastic annular body of rubber embodying the present invention.

In certain aspects the free-wheel hub is similar to that shown in the U. S. Patents 2,138,619, 2,171,810 and 2,179,478, and includes a dish-shaped drum 20, which is keyed to the hub sleeve 1 for rotation therewith, and which has connected to its periphery the spokes (not shown) of the driving wheel to form a hub for said wheel.

The free-wheel hub comprises the hub sleeve 1, which encloses the free-wheel and brake device of any desired construction, such as that shown in U. S. Patents 2,171,811 and 2,066,504, and which is mounted on an axle 2 supported between the fork members 7 of the vehicle frame.

In the drum 20 is a casing 12 containing a motor cylinder 4, which is rigid with said casing and which has a reciprocable piston 5 therein.

This casing is yieldably supported at one end by means of a resilient member 11, shown in the form of an annular body of rubber or similar elastic material forming the sole support for said casing at said end. At the other end the casing 12 is supported on a ball bearing 14.

Fixed to the hub sleeve 1 is a gear 3, driven from the piston 5 through a gear transmission (not shown), which may include a speed change gear, in the manner shown in the U. S. Patent 2,179,478.

A stationary bearing cone 6 is attached to the axle 2 to receive the brake torque, and transmits this torque to the bicycle frame 7 by means of dogs 8, rigid with said bearing cone, and extending through openings in the fork 7 and lever 9 in the manner shown and described in U. S. Patent 2,171,810. In this manner the bearing cone 6 is held in position and prevented from turning.

To the bearing cone 6, or to an intermediate part 10 rigid therewith, there is connected the annular rubber body 11 for receiving the reacting torque of the motor drive. On its outer circumference the annular body 11 is rigidly connected by vulcanization to one end of the casing 12, or to an intermediate part 13 rigid with said casing, and at its inner bore periphery it is affixed to the part 10 also by vulcanization. On the opposite end the casing 12 is supported on the hub sleeve 1 by means of the ball bearing 14.

The annular body 11 is desirably arranged on the bearing cone 6 in such a manner that the ball bearing 14 is held under a certain amount of advanced tension. In ther words, the annular body 11 is so fastened with respect to the bearing cone 6 and the inner ring or race 15 of the bearing 14 on the one hand, and with the casing 12 on the other hand, that the outer circumferential section of said annular body is strained towards the right with respect to its inner circumferential section. This arrangement is effected in such a manner as not to impair in any way the yielding movement of the annular rubber body 11 in an axial direction.

The outer end of the annular body 11 may be equipped with a protective cover 16 in the form of a sheet iron ring, having an opening 17 through which the part 10 loosely passes, the diameter of said opening being sufficiently larger than the external diameter of said part 10, so as not to impede the spring action of the rubber body 11. The other inner end of the annular body 11 facing the gear 3 may also be provided with an appropriate protective covering consisting, for instance, of some kind of flexible covering resistant to oil.

Since the annular rubber body 11 is elastic in a radial direction relative to the axle 2, the casing 12 supported at one end entirely on said body may be moved by vibrations of the motor eccentrically with respect to said axle. In other words, the casing 12 at this end may transmit the vibrations of the motor to the elastic body 11 in a direction transverse to the axis of said casing or body.

The motor cylinder 4 is arranged in such a manner that the plane of oscillation 18 of the connecting rod 19 passes through the middle of the rubber body 11 transverse to the axis of said body substantially at right angles thereto as shown in the drawing. In this manner, the compressive forces of inertia are transmitted from the plane in which they occur directly to the rubber body 11.

The vehicle frame 7, the wheel axle 2, the shell 1 of the free-wheel brake hub, the gear 3, the drum 20 enclosing the engine, the wheel spokes connected to the periphery of said drum, and the vehicle driving wheel are firmly interconnected as a unit, so that they rotate in unison, while the engine 5, the gear casing 12, and most parts of the gearing are also interconnected as a unit, and are supported on the shell 1 by means of the rubber ring 11 and the ball bearing 14. Thus the engine, casing 12 and other parts described form a unit, which is radially, tangentially and axially movable a limited extent with respect to the other unit. The extent of axial and radial movement of the engine and casing unit depends on the amount of lost play in the bearing 14. Such lost play in the bearing 14 is inevitable and its effect is reduced by the advanced axial tension of the rubber body 11 as already described. Even assuming that this bearing 14 is tight so as not to permit any lost play, the engine and casing unit will tilt or pivot to a limited extent about the bearing 14, so that this unit will have at the section where the annular rubber body 11 is mounted, a limited substantially radial movement or a movement transverse to the axis of the hub. The inwardly extending sleeve on the casing 12 embraces the hub sleeve 11 loosely enough so that this limited tilting or pivotal movement of the casing about the bearing 14 is permitted. In any case there are no parts, such as flanged rings, directly associated with or enclosing the rubber body 11 to prevent the transmission of vibrations to said body if any occur.

The mobility of the different parts in all directions as described avoids a transmission of the shocks arising from uneven roads, and also avoids vibration and resonance of the motor spokes from being transmitted to the seat of the rider.

Due to the arrangement in the sense of the invention, the annular body 11 does not only produce cushioning in a tangential direction, by which variable movements of the motor, shocks caused by unevennesses of road surfaces, oscillating mass pressures, and the reacting torque of the motor, are compensated, but also springing in a radial direction by which, especially in connection with an arrangement under which the plane of the compressive forces of inertia (connecting rod middle plane) passes through the middle of the bearing, it receives, and keeps away from the vehicle frame the remnant forces of the non-compensated crank drive which have as yet not been cushioned by the tangential springing.

Finally, the new arrangement combines with such advantage the additional one that, due to the installation of a light spring-action operating in an axial direction, there is no play in the counterbearing.

What we claim is:

1. In a free-wheel brake hub of the type driven by a motor mounted on a driving wheel, the combination comprising a stationary member, a casing for the transmission gearing of said motor, and an annular body of resilient rubber fixed to and extending between said casing and said stationary member, and constituting the sole support for said casing at the section thereof where said body is mounted, to permit, while elastically resisting, rotary and axial vibratory movements of said casing, and also vibratory movement of said casing at said section in a direction transverse to the axis of the hub.

2. In combination, a free-wheel brake hub, and a motor for driving said hub mounted on the driving wheel, said hub comprising a stationary member, a casing for the transmission gearing of said motor, and an annular body of resilient rubber fixed to and extending between said casing and said stationary member, and constituting the sole support for said casing at the section thereof where said rubber body is mounted to permit, while elastically resisting, rotary and axial vibratory movements of said casing, and also vibratory movement of said casing at said section in a direction transverse to the axis of the hub, said motor being mounted with the axial plane of its connecting rod in which the compression forces of inertia manifest themselves, substantially coinciding with the plane passing substantially through the center of the annular body of rubber in a direction substantially at right angles and transverse to the axis of said rubber body.

3. In a free-wheel brake hub of the type driven by a motor mounted on a driving wheel, the combination comprising a stationary member, a casing for the transmission gearing of said motor, and means for supporting said casing, comprising an annular body of resilient rubber vulcanized to said casing near one end and to said stationary member, and a ball bearing device near the other end of said casing, said annular body constituting the sole support for said casing at said first-mentioned end to permit, while elastically resisting, vibratory rotary and axial movements of said casing, and also vibratory movement of said casing at said last-mentioned end in a direction transverse to the axis of the hub, said rubber body being tensioned axially in normal position of said brake hub when said hub is not operated, said tension being transmitted to said bearing through said casing, whereby free play of said bearing is effected against the resistance of said rubber body.

4. In combination, a free-wheel brake hub, and a motor for driving said hub mounted on the driving wheel, said hub comprising a stationary member, a casing for the transmission gearing of said motor, and means for supporting said casing, comprising an annular body of resilient rubber vulcanized to one end of said casing and to said stationary member, and a ball bearing device for the other end of said casing, said annular body constituting the sole support for said casing at one end to permit, while elastically resisting, vibratory rotary and axial movements of said casing, and also vibratory movement of said casing at said last-mentioned end in a direction transverse to the axis of said hub, said rubber body being tensioned axially in normal position of said brake hub when said hub is not operated, said normal tension being transmitted to said bearing through said casing, whereby free play of said bearing is yieldably resisted by said rubber body, said motor being positioned with the axial plane of its connecting rod in which the compression forces of inertia manifest themselves substantially coinciding with the plane passing substantially through the center of the bearing formed by said rubber body in a direction substantially at right angles and transverse to the axis of said rubber body.

GUSTAV STEINLEIN.
LUDWIG BRUCKMOSER.